March 20, 1962 R. R. READING 3,026,045
SPRAY DEVICE
Filed April 3, 1961 2 Sheets-Sheet 1

RALPH R. READING,
INVENTOR.

Huebner, Beehler,
Worrel & Herzig.
ATTORNEYS.

BY:

March 20, 1962 R. R. READING 3,026,045
SPRAY DEVICE
Filed April 3, 1961 2 Sheets-Sheet 2
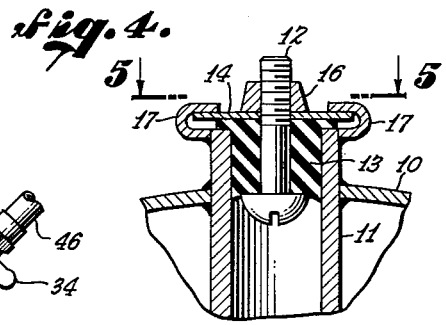
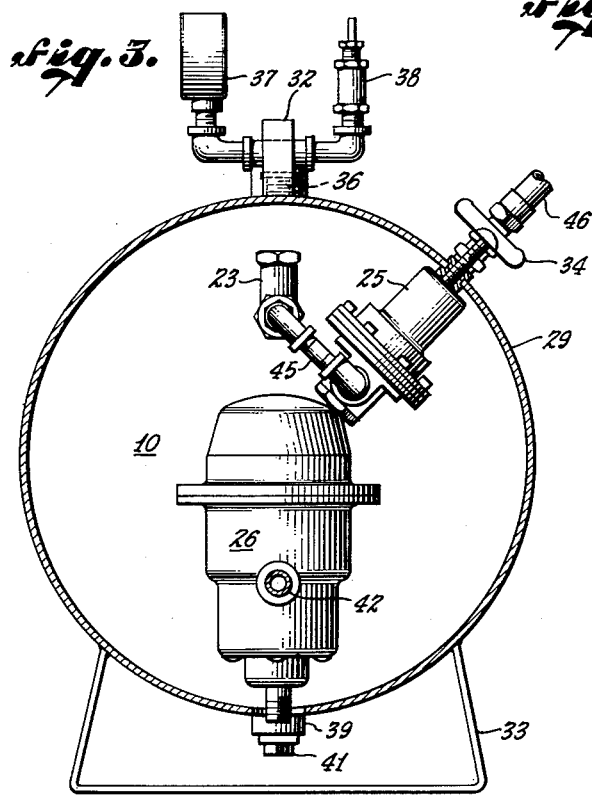
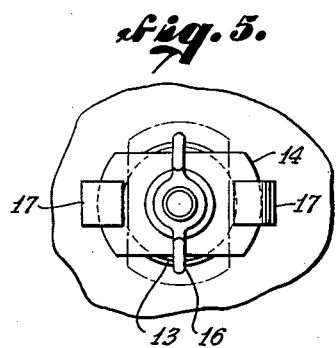
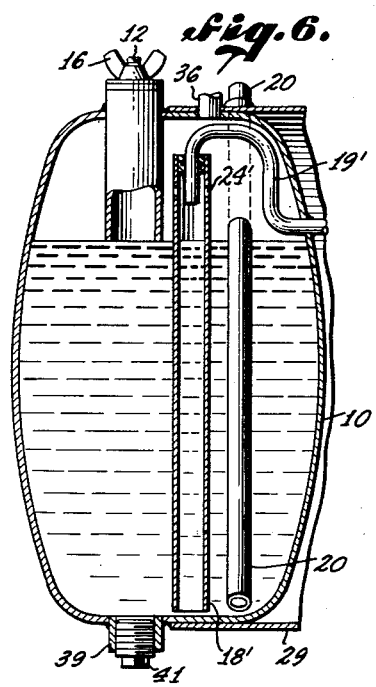
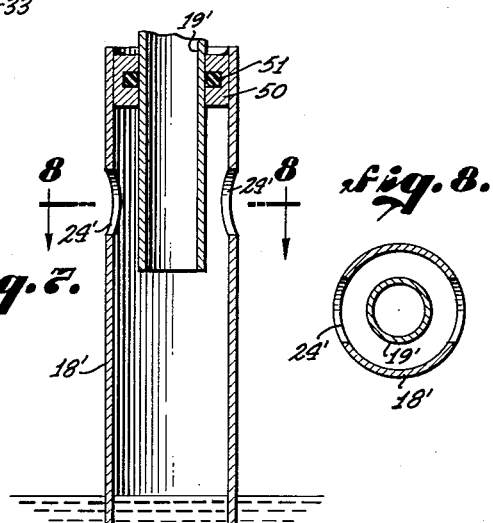
RALPH R. READING,
INVENTOR.
Huebner, Beehler,
Worrel & Herzig.
ATTORNEYS.

United States Patent Office 3,026,045
Patented Mar. 20, 1962

3,026,045
SPRAY DEVICE
Ralph R. Reading, 600 E. El Segundo Blvd.,
Hawthorne, Calif.
Filed Apr. 3, 1961, Ser. No. 100,077
9 Claims. (Cl. 239—143)

The present invention relates to an apparatus for dispensing rubber cement and relates particularly to the application of rubber cement to a tire carcass.

This application is a continuation-in-part of application, Serial No. 540,823, filed October 17, 1955, now abandoned, which was a continuation-in-part of my application Serial No. 445,323 filed July 23, 1954, now Patent No. 2,721,148.

An object of my invention is to provide a safe, rapid and economical method and apparatus for dispensing rubber cement.

Another object of my invention is the provision of such a method and apparatus for spraying rubber cement under fireproof conditions and conditions of reduced health hazard to the surface of an article.

A further object is to apply an even coating of rubber cement to an article such as a tire carcass so that the strength of adhesion of an applied layer such as a camelback is greatly increased and the resulting product is free of blow-holes.

An additional object of my invention is to economize in the labor, material, time and equipment required to apply camelback to a given number of tire carcasses and at the same time produce a better, stronger and more uniform product.

These and other related objects I prefer to accomplish by providing an apparatus for dispensing rubber cement comprising the following: A pressure vessel is equipped with cement introduction means for conveniently charging a measured volume of liquid cement to the vessel. The volume of cement charged is made to bear a rather definite ratio to the total capacity of the vessel. The pressure vessel also is provided with gas inlet means for introducing a quantity of gas under pressure into the vessel at a zone below the surface of the cement therein, preferably near the bottom of the liquid body of cement. The gas is preferably injected into the liquid cement through small apertures such as pin holes to produce in the pressure vessel a dispersion, preferably a homogeneous emulsion of gas in liquid cement under a desired final pressure. In addition, the pressure vessel is provided with outlet means for discharging and dispensing the emulsion from the vessel and on to the surface of an article. I prefer, however, to first admix the emulsion with an additional amount of gas under pressure before applying the cement to a desired surface. This is done by use of an atomizer or spray gun of conventional design.

A more detailed description of specific embodiments of my invention is given with reference to the drawings, wherein:

FIGURE 1 is a diagram showing the pressure vessel of my invention connected to a spray gun and to an air compressor through a check valve, reducing valve and air cleaner;

FIGURE 3 is a cross-sectional view taken on line 3—3 of FIGURE 2;

FIGURE 5 is a fragmentary plan view of the safety closure taken on line 5—5 of FIGURE 4;

FIGURE 6 is a partial elevational view, similar to that of FIGURE 2, showing a different embodiment of the invention;

FIGURE 7 is a fragmentary, enlarged view showing a detail of FIGURE 6; and

FIGURE 8 is a cross-sectional view taken on the line 8—8 of FIGURE 7.

The size of pressure vessel 10 will depend largely upon the amount of cement to be consumed, among other factors. I have found that a vessel of about 3 gallons capacity serves quite well for most purposes, because relatively little cement is needed in my process. The shape of the vessel is not particularly material to the objects of my invention, but I have found that a vessel of generally rounded shape is conveniently fabricated by welding pre-shaped sections together. However, pressure vessel 10 need not be constructed as a single unit but can, for example, be made to have a body and a top, or lid, provided with clamping means and sealing means for effecting a gas-tight seal between the lid and the body of the vessel. Other designs of the vessel 10 also can be used.

Figure 2:
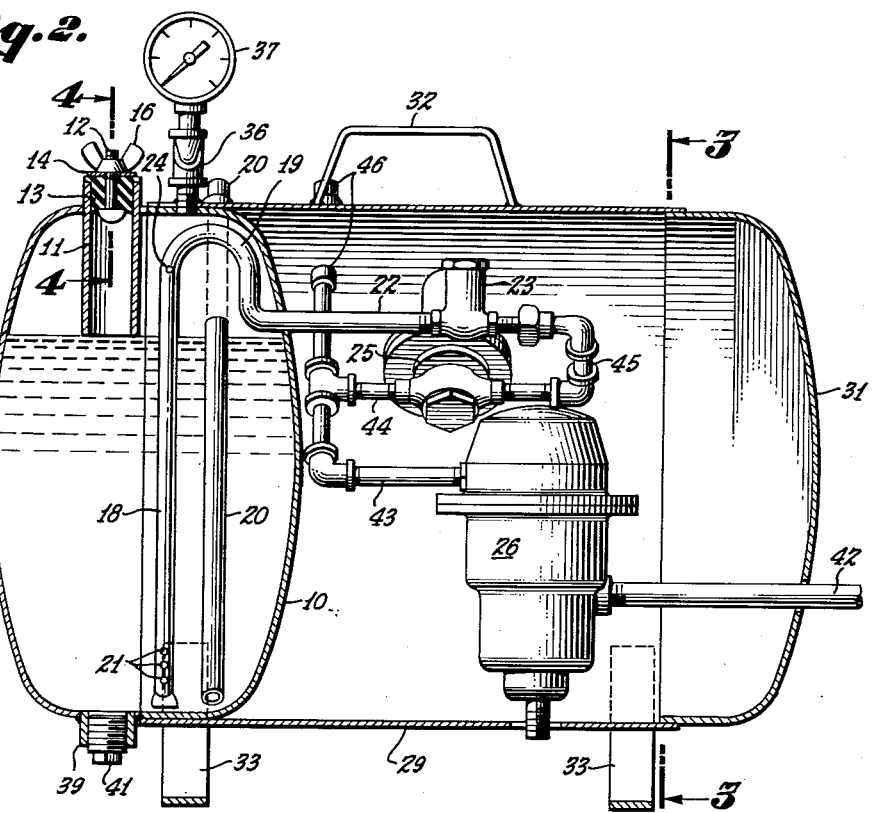
FIGURE 2 is an elevational view, partly in section, of an embodiment showing a compact arrangement of the pressure vessel, check valve, reducing valve, and air cleaner enclosed in a portable container.
Figure 4:
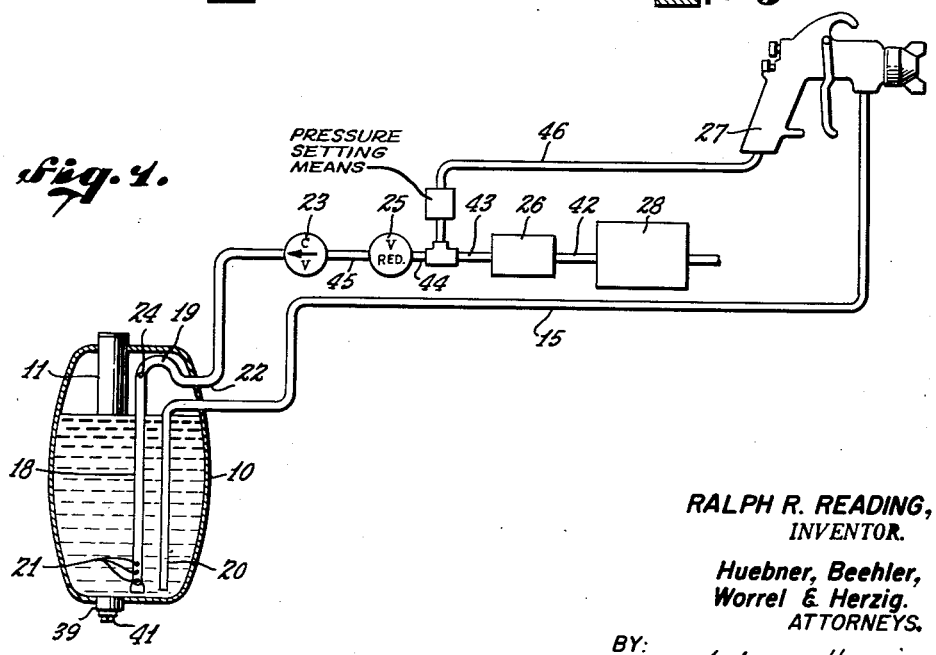
FIGURE 4 is a fragmentary vertical sectional view taken on line 4—4 of FIGURE 2 showing a detail of a gas-tight safety closure.

The vessel 10 shown in FIGURES 1 and 2 of the drawings is provided with a filling tube 11 with its upper end sealed into the wall of the upper end of the vessel and with its lower end extending into the interior of the vessel a predetermined distance. The tube 11 can be fixed into the wall of the vessel by welding or by threaded means, for example. The length of tube 11 extending into vessel 10 is determined to be about 2.5 inches so that upon filling the vessel with liquid cement through tube 11 to the level coinciding with the bottom of the tube, as shown in FIGURE 1, the vessel will contain about 2.5 gallons of cement and an air space of about 0.5 gallon will remain above the surface of the cement.

The diameter of tube 11 is about 1 inch for convenience of introducing cement therethrough. The mouth of the tube is provided with a gas-tight safety closure consisting of an inverted bolt 12 tightly fitted in a flanged rubber gasket 13 fitted into the tube 11; a pressure plate 14 and a wing nut 16 compress the gasket 13. The closure is prevented from blowing out of the tube by two clamping fingers 17 formed on the mouth of tube 11 and adapted to stop any upward movement of pressure plate 14.

Pressure vessel 10 also is provided with a gas inlet tube 18 extending to the bottom of the vessel. I prefer to form a gooseneck 19 in the upper portion of tube 18 close to the top of vessel 10 and to seal the bottom end of tube 18 as by tightly pinching or soldering it shut. Near the sealed end of the tube are formed a half-dozen or so apertures, or pin holes 21 of about $\frac{1}{32}$ inch diameter. These holes serve to disperse compressed gas charged to the vessel 10 to form an emulsion thereof in the liquid cement previously charged to the vessel. It is to be understood that the invention embraces other equivalent ways and means of producing the emulsion.

Inlet tube 18 can be conveniently made of ¼ inch copper tubing in the embodiment shown in the drawing. The tube 18 is connected to a ¼ inch nipple 22 welded or threaded into the upper side wall of vessel 10. Connected to nipple 22 is a check valve 23 for checking the back-pressure in vessel 10. As a safeguard against the event of gas leakage past check valve 23, a small relief hole 24 of about $\frac{1}{32}$ inch diameter is drilled in the delivery leg of tube 18 just below the highest point in the gooseneck 19. Relief hole 24 will permit a leak-back from the air space in the upper part of vessel 10 rather than from the end of tube 18 at the bottom of the vessel and thus avoids leak-back of cement emulsion into check valve 23, pressure reducing valve 25, air cleaner 26, spray gun 27, and air compressor 28 during non-use of the apparatus, such as over-night or week-end non-use.

Emulsion discharge, or outlet tube 20, extends to almost the bottom of vessel 10 and penetrates the side wall thereof at about the same level as does nipple 22 and at about the initial level of the cement as determined by the lower end of filling tube 11. A ¼ inch pipe is used for this purpose. It is welded into the side wall of vessel 10 and its delivery end is connected to spray gun 27 through flexible pressure tubing 15.

Any convenient arrangement of the auxiliary apparatus about the pressure vessel 10 can be used, but I have found it advantageous to compactly enclose the check valve, pressure reducing valve, and air cleaner together with the connecting lines in a cylindrical jacket 29 as shown in FIGURES 2 and 3. The pressure vessel 10 is welded into one end of the cylindrical jacket 29 and the other end of the jacket is closed by a removable dished end 31. The jacket 29 is provided with a carrying handle 32 and legs 33. The handle 32 and legs 33 provide means for physically agitating the jacket 29 and vessel 10 to produce the emulsion by churning action. The contraction of the legs 33 and handle 32 are particularly intended for this purpose. Holes through the jacket wall accommodate a key 34 to the pressure reducing valve 25, a water discharge line from air cleaner 26, bypass air line 46, discharge tube 20, and a line 36 communicating with vessel 10 through the top wall thereof and connected to a pressure gage 37 and a safety valve 38. A short pipe nipple 39 is welded into the bottom wall of vessel 10 and is provided with a plug 41. The opening through the nipple can be used to drain vessel 10 if desired.

The conventional vulcanizing tire cements on the market containing about a pound of latex to a gallon of solvent, for use in the apparatus of my invention are diluted by using two volumes of these cements to three volumes of rubber solvents such as the hydrocarbon solvents or thinners marketed by petroleum refining companies for rubber solvent purposes. This renders the conventional tire cements more fluid and less viscous for better application by means of a spray gun as compared to the hand brushing application method generally used. A cement that has proven to be very satisfactory for my method and apparatus has the following dry composition; that is, minus the solvent:

| | Percent |
|---|---|
| Natural rubber | 84.84 |
| Zinc oxide | 4.25 |
| Accelerator | 0.85 |
| Curing aid | 1.01 |
| Antioxidant | 0.68 |
| Carbon black | 6.37 |
| Sulfur | 2.00 |
| | 100.00 |

The cement slab stock of the above composition is mixed with a petroleum rubber solvent in the ratio of one pound of solids to three gallons of solvent until solution and suspension are complete. The finished cement has a viscosity of about 55 to 58 seconds through a ⅛ inch orifice Ford type test cup at 80° F.

Instead of natural rubber, I may use other elastomers as the major component of the cement, especially for application to various articles other than tire carcasses. For example, a few of the synthetic elastomers that can be used are butyl rubber, butadiene styrene copolymer, butadiene acrylonitrile copolymer, polychloroprene, and alkylene polysulfide.

I prefer to use a specially selected petroleum solvent as the rubber solvent in the cement for tire carcasses because of its low cost, its inertness, and its low toxicity. Other solvents, however, can be used such as benzene, cyclohexane, carbon tetrachloride, and carbon disulfide, for example, especially for some of the various applications other than for tire carcasses. Water cannot be used as a component of the cement because it destroys its adhesive character. The accelerator, the curing aid, and the antioxidant can be any of the well-known materials in these classes.

In the operation of the apparatus, air is taken from the atmosphere and compressed in compressor 28. The compressed air is passed through air cleaner 26 via lines 42 and 43 to remove condensed water therefrom. A bypass line 46 of flexible pressure tubing conveys compressed air to a spray gun 27 as required by the operator of the gun. From line 43 the dried compressed air is passed through pressure reducing valve 25 and check valve 23 via lines 44 and 45 and into pressure vessel 10 via nipple 22 and inlet tube 18. Other gases than air can be used in the method. For example, non-oxidizing gases such as nitrogen or carbon dioxide can be used.

To make up a batch of emulsion, about 2.5 gallons of rubber cement of the above-described characteristics is charged to vessel 10 through filling tube 11 and the tube is closed by means described above. Compressed air at an initial pressure of about 40 pounds per square inch gage, as controlled by reducing valve 25, is dispersed in the liquid cement through pin holes 21. After several seconds the pressure vessel 10 is filled with an air in cement emulsion under a pressure of about 40 pounds per square inch gage. By adjustment of reducing valve 25, the pressure in vessel 10 is then reduced to about 15 pounds per square inch gage for normal application purposes. The initial pressure can, however, be higher than 40 pounds per square inch, and may be as high as say 200 pounds per square inch gage, or higher. Similarly, the application pressure can be higher or lower than 15 pounds per square inch and may be as high as about 200 pounds per square inch gage, or higher, or as low as say about five pounds square inch gage, or lower.

When the cement is prepared as described above, it is an emulsion containing about 10 to about 20 percent air and about 80 to about 90 percent cement by volume of the mixture at the application pressure.

Although rubber cement can be effectively applied to many different types of articles by the use of my invention for illustrative purposes, I shall describe the use of my method and apparatus for applying rubber cement to tire carcasses. The pressure of the compressed air fed to spray gun 27 is set at about 150 to 200 pounds per square inch while the pressure over the emulsion in vessel 10 is held at about 15 pounds per square inch. The setting means may be of any type supplied with commercial compressors. A tire carcass rotatably mounted on a holder is caused to rotate while the spray gun is put into operation and a thin uniform coat of cement is sprayed on the surface of the carcass in about five seconds. The spraying operation is stopped simply by the spray gun controls.

With air and emulsion pressures set as described, about three cubic feet of air is used with about ⅙ ounce of cement. The spray gun is of known commercial type having orifices for discharge of air and cementitious material as is well known guns of this type. Suitable spray guns are shown in patents numbered 1,361,527, 1,651,466, 1,662,042, and 2,616,761. The size of the effective orifice for cementitious material is adjustable by the lower of the two knobs shown on the gun in FIG. 1. The relationship of three cubic feet of air to ⅙ ounce of cement is realized with the air and emulsion pressures as described. The relationship can be readily achieved by one skilled in the art knowing the inherent structure and properties of the gun. From the above data the size of the effective air orifice (the aggregate in the case of multiple orifices), and the size of the effective material orifice can be readily calculated. However, a specific example is given as follows:

| | |
|---|---|
| Air pressure | 150 p.s.i. |
| Pressure on material | 15 p.s.i. |
| Effective air orifice | .00794 sq. in. (.100″ diam.). |
| Effective material orifice (round) | .026″ diam. |
| Air volume | 3 cu. ft. |
| Material amount | ⅙ ounce. |
| Time duration | 5″. |
| Temperature | Room (65° F.). |

The above example provides a high safety factor in respect to non-inflammability and non-toxicity. The concentration of material in the sprayed mixture can be readily adjusted up or down, for example, by adjusting the effective material orifice or by adjusting the air pressure by adjusting the setting at the compressor.

The above example will produce a sprayed mixture of less than 1.2 parts of cementitious material to 100 parts of air which is a non-inflammable mixture even with pure rubber solvent thereby providing a substantial safety factor. There is no need for the cement coating to dry and the camelback can be applied immediately to the sprayed carcass. Since there is used a very large volume of air and very small amount of cement the ratio of hydrocarbon solvent to air is below the range of explosive mixtures and there is no explosion or fire hazard in the vicinity of the spray gun operator. Also, for the same reason, the concentration of the hydrocarbon vapors produced during the spraying operation is sufficiently low to reduce to a minimum any health hazard to the operator, by reducing the concentration sufficiently to insure that the mixture is non-toxic. The invention assures this result.

As stated above the coating may be applied in five seconds and this may be with a tire carcass rotating at thirty revolutions per minute. In a single revolution the material dries; i.e. it meets the test of being dry to the touch and smell (odorless). This test assures that non-flammability and/or non-toxicity has been realized.

Another important advantage of the relatively high delivery pressure is that it drives the material deep into the buffing pores of the tire carcass. These pores or serrations are formed when the tire carcass is shaped by buffing with a buffing tool.

In comparing my apparatus for spraying cement on the carcasses with the method of hand brushing application generally used in the tire retreading industry, some striking facts become apparent. In the first place, the cement, heretofore a fire and health hazard during the hand brushing application, has been rendered fireproof and harmless to health by the use of my invention. Secondly, a saving of about 95 percent in the cement consumed has been effected by my method. About 300 to 400 tires per gallon cement can be treated by my method compared to about 15 to 18 by the hand brushing method. Thirdly, as there is no requirement that the tires treated by my method be permitted to dry after coating them with cement, no drying racks are required. In the hand brushing method, drying times of about ½ to 1½ hours are required. Furthermore, the danger of cement oxidation is minimized in my method, because of the elimination of the air drying time. Fourthly, only about five seconds is required to apply the cement coating to a tire carcass by my method compared to about two to three minutes by the hand brushing method. Fifthly, because my spraying method produces a uniform cement coating on the tire, blow holes occasioned by patches of excessive amounts of cement, such as occur in hand brushing, have been eliminated. In addition, adhesion of the camelback to the tire carcass has been shown by tests to be about 25 percent stronger when my method is used than when hand brushing is used.

A microscopic examination of the air in cement emulsions produced as described above in pressure vessel 10 revealed the presence of a multiplicity of minute air bubbles evenly dispersed throughout the emulsion and in intimate contact with the surrounding liquid and solid components of the cement composition. This uniform emulsion accounts for the fact that solid components of the cement composition do not settle out of the emulsion in vessel 10 even during prolonged standing periods, during which the pressure in the vessel is maintained at about ten to fifteen pounds per square inch gage. Also, no sludging or gumming of the spray gun occurs even after the emulsion has set for prolonged periods. In the liquid cement itself, on the other hand, solid components settle after standing periods of about an hour, and it is necessary to agitate the mixture to again disperse the solids in the liquid cement.

If a liquid cement, instead of my emulsion, is fed directly to the spray gun with a stream of air under pressure, there is sludging and gumming of the spray gun and an uneven coating of cement results. It frequently becomes necessary to agitate and re-suspend the settled solids in the liquid. In addition, the explosion and health hazards are increased when using the liquid cement instead of my emulsion of gas in liquid cement. The herein invention can be practiced to achieve the results defined above, however, even though an emulsion is not produced.

Equivalent arrangements may be utilized within the scope of the foregoing. For example, the necessary pressure or differential, for delivering liquid from vessel 10 to the spray gun may be produced in other ways such as by a gravity head discharge from vessel 10 or substituting a known, equivalent spray gun which produces a suction in line 15.

Another specific embodiment of my invention is shown in FIGURES 6 to 8 of the drawings. In this embodiment, the relief hole 24 through goose-neck 19', best shown in FIGURES 1 and 2, is eliminated by connecting the delivery end of the goose-neck to a somewhat larger tube 18', instead of the previously described delivery leg 18 of the same diameter as the goose-neck. The delivery end of the goose-neck 19' telescopes into the uppermost end of tube 18'. The connection is made through a sealing ring 50 tightly fitted inside the upper end of delivery tube 18', by an O-ring 51 fitted in an annular groove in the sealing ring, as best shown in FIGURE 7. Slightly below the sealing ring 50, the delivery tube 18' is provided with one or more apertures 24'. These apertures preferably are positioned somewhat above the lower end of the delivery end of goose-neck 19', as shown. The lowermost end of delivery tube 18' preferably is open-ended and terminates a short distance above the bottom of pressure vessel 10.

Use of the apparatus is as described above in connection with the embodiment of FIGURES 1 to 6. After vessel 10 is charged with the rubber cement, compressed air is blown into the cement through delivery tube 18'. Through a venturi action, air initially is sucked into the upper end of delivery tube 18' through apertures 24' and is mixed with air from the delivery end of goose-neck 19'. This mixture of air discharges into the rubber cement in vessel 10 through the lowermost, open end of delivery tube 18' and is dispersed in the rubber cement. An emulsion of air in rubber cement then is sucked into delivery tube 18' by the venturi action through apertures 24', and is mixed with the air discharging from the delivery end of goose-neck 19'. The air is, in this manner, thoroughly emulsified in the cement to produce a uniform dispersion of air bubbles in liquid rubber cement. The subsequent procedural steps for spraying the air-cement dispersion are the same as described above in connection with the first embodiment.

Leak-back of cement past check valve 23 is prevented by apertures 24' as described above in connection with relief hole 24. Apertures 24' will permit a leak-back from the air space in the top of vessel 10 rather than from the lowermost end of delivery tube 18' and thus avoid leak-back of cement emulsion into the check valve 23 and connected apparatus during over-night apparatus shut-downs, for example.

Although I have described my invention largely with reference to the application of rubber cement to a tire carcass, it will readily be understood that the invention can advantageously be used in the formation of many other articles and for the provision of a coating of rubber on many types of surfaces. My invention, therefore, is not to be restricted except as necessitated by the prior art and by the spirit of the appended claims.

What is claimed is:

1. Apparatus for dispensing rubber cement dissolved in inflammable solvent comprising a generally vertical pressure vessel, vertical air inlet conduit means inside the vessel and provided with a closed lower end and a multiplicity of apertures of about $\frac{1}{32}$ inch diameter through the side wall of the conduit adjacent the closed end thereof and adjacent the bottom of the vessel for introducing a quantity of air into the vessel below the surface of a quantity of rubber cement therein and forming a stable emulsion of gas in rubber cement, a relief aperture through the wall of the conduit means adjacent the upper end thereof for prevention of leak-back of cement through the conduit means, a goose-neck bend at the upper end portion of the conduit means above the relief aperture for additionally preventing leak-back of cement through the conduit means, check valve gas pressure control means including a reducing valve connected to the air inlet conduit means for controlling and maintaining the gas pressure in the vessel, vertical conduit outlet means extending from the bottom of the vessel through the walls thereof for discharging an emulsion of gas in cement from the vessel, and spray means communicating with the outlet means and having direct communication with a source of gas under pressure for mixing a stream of discharging emulsion with a stream of the gas under pressure and for spraying the resulting mixture of gas and cement emulsion onto a surface, said source of gas having such pressure in relation to the pressure maintained in said vessel by said reducing valve that the ratio of solvent to air in the sprayed mixture is below the explosive range.

2. Apparatus for dispensing rubber cement dissolved in an inflammable solvent in known proportions comprising a pressure vessel, vertical gas inlet conduit means inside the vessel for introducing a quantity of gas into the vessel from a source of gas under pressure and for sub-dividing the gas and forming an emulsion of gas in rubber cement in the vessel, a control valve for regulating the pressure applied through said conduit means, a relief means establishing communication between the upper inside of the inlet conduit and the upper inside of the vessel for prevention of leak-back of cement through the conduit means, vertical outlet conduit means extending from the bottom of the vessel through the walls thereof for discharging an emulsion of gas and cement from the vessel, and spray means communicating with the outlet means and directly with said source of gas under pressure through a separate conduit for spraying a mixture of the cement emulsion with additional gas, said source of gas being set to deliver a predetermined pressure, said control valve having means to hold the pressure in said vessel at a value relative to the pressure delivered by said source so that the quantity of gas delivered by said sources of gas under pressure to said spray means is in a relatively large ratio by volume of air to solvent whereby the sprayed mixture is non-inflammable.

3. Apparatus for dispensing rubber cement dissolved in a predetermined ratio in an inflammable solvent comprising a pressure vessel, vertical gas inlet conduit means inside the vessel and provided with a closed lower end and a plurality of small apertures through the side wall of the conduit adjacent the closed end thereof and adjacent the bottom of the vessel for introducing a quantity of gas into the vessel, said small apertures being of a size capable of forming an emulsion of gas in rubber cement in the vessel, control valve means for regulating the pressure applied in the vessel, a relief aperture through the wall of the conduit means adjacent the upper end thereof for prevention of leak-back of cement through the conduit means, vertical outlet conduit means extending from the bottom of the vessel through the walls thereof for discharging an emulsion of gas and cement from the vessel, and a spray device communicating with the outlet means, means whereby said spray device has communication with a source of gas under pressure for spraying a mixture of the cement emulsion with additional gas, means for setting the pressure of gas supplied from said source of gas to said spray device, said control valve means having means for holding the pressure applied in the vessel at a value relative to the set pressure of gas supplied from said source of gas as such that a large volume of gas is supplied to the spray means relative to the rate of supply of inflammable solvent such that the ratio is below the range of explosive mixtures.

4. Apparatus for dispensing rubber cement dissolved in an inflammable solvent in predetermined proportions comprising a pressure vessel, vertical gas inlet conduit means inside the vessel and having outlet means adjacent the bottom of said vessel for introducing a quantity of gas into the vessel from a source of gas under pressure and for sub-dividing gas and forming an emulsion of gas in rubber cement in the vessel, means for regulating the pressure of gas applied in the vessl through said conduit means to restrict said pressure to a predetermined level, vertical conduit means extending from the bottom of the vessel through the walls thereof for discharging an emulsion of gas in cement from the vessel, spray means communicating with the outlet means, a source of gas under pressure, said spray means having communication directly with said source of gas under pressure for spraying a mixture of the cement emulsion with additional gas, means for setting the pressure of gas delivered from said source of gas under pressure, said pressure regulating means having means to hold the pressure in said vessel at a value in relation to the set pressure of said source of gas under pressure that the ratio of the volume of gas to inflammable solvent is sufficiently high so that the concentration is held below the range of explosive mixtures.

5. Apparatus for dispensing rubber cement dissolved in inflammable solvent in predetermined known proportions comprising a pressure vessel, gas inlet conduit means communicating with the vessel provided with an end and having a plurality of small apertures therein below the liquid level for introducing a quantity of gas into the vessel, said small apertures having a size for sub-dividing the gas and forming an emulsion of gas in rubber cement in the vessel, outlet conduit means extending from the vessel for discharging an emulsion of gas in cement from the vessel, a spray device communicating with the outlet means, a source of gas under pressure, said spray device communicating with said source of gas under pressure for spraying a mixture of the cement emulsion with additional gas, means for setting the pressure of said source of gas under pressure, a control valve having means for regulating the pressure applied in said vessel and having means to hold said pressure at a value relative to the pressure setting of said source of gas under pressure so that the ratio of the volume of gas supplied to the volume of inflammable solvent is sufficiently high so that the concentration of the mixture is below the range of explosivity.

6. Apparatus for dispensing rubber cement dissolved in an inflammable solvent in known predetermined proportions comprising a pressure vessel, gas inlet means for introducing a quantity of gas into the vessel from a source of gas under pressure and for sub-dividing the gas and forming an emulsion of gas in rubber cement in the vessel, said means including a conduit having apertures therein below the liquid level of a size capable of forming said emulsion and pressure control valve means for regulating the gas pressure to form the emulsion, outlet means extending from the vessel for discharging an emulsion of gas in cement from the vessel, spray means communicating with the outlet means and directly with said source of gas under pressure for spraying a mixture of the cement emulsion with additional gas, means whereby said source of gas may be set to deliver gas at a predetermined pressure, said control valve being positioned to hold the pressure in said vessel at a predetermined pressure during the delivery of mixture from said spray means whereby the quantity of gas delivered to said spray means from the said source of gas under pressure is in sufficient volume relative to the delivery of emulsion of gas in cement that the sprayed mixture is non-inflammable by reason of gas dilution of a solvent.

7. Apparatus for dispensing rubber cement dissolved in an inflammable solvent in known predetermined proportions comprising a pressure vessel, gas inlet means for introducing a quantity of gas into the vessel from a source of gas under pressure and for holding an emulsion of gas in rubber cement in the vessel, and pressure control valve means for regulating the gas pressure to hold the emulsion, outlet means extending from the vessel for discharging an emulsion of gas in cement from the vessel, spray means communicating with the outlet means and directly with said source of gas under pressure for spraying a mixture of the cement emulsion with additional gas, means whereby said source of gas may be set to deliver gas at a predetermined pressure to said spray means, said control valve being positioned to hold the pressure in said vessel at a predetermined pressure during the delivery of mixture from said spray means whereby the quantity of gas delivered to said spray means from the said source of gas under pressure is in sufficient volume relative to the delivery of emulsion of gas in cement that the sprayed mixture is non-inflammable.

8. The apparatus of claim 7 including means for forming an emulsion of gas in rubber cement in the vessel.

9. Apparatus for dispensing a material comprising rubber cement dissolved in an inflammable solvent in predetermined proportions, comprising: a vessel, means to apply gas pressure in said vessel and to conduct a stream of material from said vessel to a spray gun to pass through a first orifice therein, means for conducting gas under pressure directly to the spray gun to pass through a second orifice thereof, means for establishing the gas pressure conducted directly to said spray gun at a predetermined level relative to the pressure applied in said vessel whereby the delivery of gas from the spray gun is in sufficient volume relative to the material sprayed that the mixture is non-inflammable, the effective relative sizes of said orifices through which the gas and material are delivered being such that a predetermined ratio of material to gas is delivered to said spray gun.

References Cited in the file of this patent

UNITED STATES PATENTS

| | | |
|---|---|---|
| 1,046,572 | Eder | Dec. 10, 1912 |
| 1,141,243 | Foster | June 1, 1915 |
| 1,194,358 | Cecil et al. | Aug. 15, 1916 |
| 1,752,530 | Lynn | Apr. 1, 1930 |

FOREIGN PATENTS

| | | |
|---|---|---|
| 172,979 | Switzerland | Nov. 15, 1934 |

Dedication 3,026,045.—*Ralph R. Reading*, Hawthorne, Calif. SPRAY DEVICE. Patent dated Mar. 20, 1962. Dedication filed July 10, 1968, by the assignee, *John M. Lee*.

Hereby dedicates to the people of the United States the entire term of said patent.

[*Official Gazette January 7, 1969.*]